US006959185B1

(12) United States Patent
Stage

(10) Patent No.: US 6,959,185 B1
(45) Date of Patent: Oct. 25, 2005

(54) ROUTING

(75) Inventor: Erling Bugge Stage, Soroe (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/913,273

(22) PCT Filed: Feb. 10, 2000

(86) PCT No.: PCT/EP00/01052

§ 371 (c)(1),
(2), (4) Date: Nov. 1, 2001

(87) PCT Pub. No.: WO00/48351

PCT Pub. Date: Aug. 17, 2000

(30) Foreign Application Priority Data

Feb. 12, 1999 (GB) .................................. 9903262

(51) Int. Cl.[7] .......................... H04M 3/42; H04Q 7/20
(52) U.S. Cl. .................................. 455/414.1; 455/466
(58) Field of Search ............................. 455/414.1, 466; 701/1; 709/246; 719/313

(56) References Cited

U.S. PATENT DOCUMENTS 6,230,004 B1 * 5/2001 Hall et al. ............... 455/414.2
6,253,061 B1 * 6/2001 Helferich .................. 340/7.22

FOREIGN PATENT DOCUMENTS

WO  WO98/26530  6/1998
WO  WO00/18149  3/2000

OTHER PUBLICATIONS

"Distributed Packet Rewriting and its Application to Scalable Server Architectures" by Bestavros, et al 1997 pp. 1-12.
"The Magicrouter, an Application of Fast Packet Interposing" 1996.
WAP Architecture Version Apr. 30, 1998.

* cited by examiner

Primary Examiner—Benny Q. Tieu
(74) Attorney, Agent, or Firm—Antonelli, Terry, Stout and Kraus, LLP.

(57) ABSTRACT

A director for routing a message from a client to a chosen one of a plurality of servers to access a resource and for routing the response of the resource from the chosen server to the client. Each message has an indication of its origin, an indication of its destination and a message body. The message body comprises first input means for receiving a first input message from the client, first output means for providing a first output message to the chosen server, second input means for receiving a second input message from the chosen server in response to the first output message, an indication identifying the client; and second output means for providing a second output message to the one client in response to the second input message, indicating its source as the routing means, and its destination as the one client.

13 Claims, 13 Drawing Sheets

FOR PHONE 2
IN FIG. 3

| SYMBOLIC ROUTING TABLE ||
|---|---|
| SYMBOLIC RESOURCE ADDRESS | OBJECT ADDRESS |
| CALL | 30 |
| SMS | 32 |
| PHONE BOOK | 34 |
| DEFAULT | 36 |
| DEFAULT | 38 |

(SERVER)
(SERVER)
(SERVER)
(APPLICATION)
(APPLICATION)

FIG. 5a

FOR ACCESSORY DEVICE 40 IN FIG. 3

| SYMBOLIC ROUTING TABLE ||
|---|---|
| SYMBOLIC RESOURCE ADDRESS | OBJECT ADDRESS |
| PHONEBOOK | 42 |
| DEFAULT | 44 |

(SERVER)
(APPLICATION)

FIG. 5b

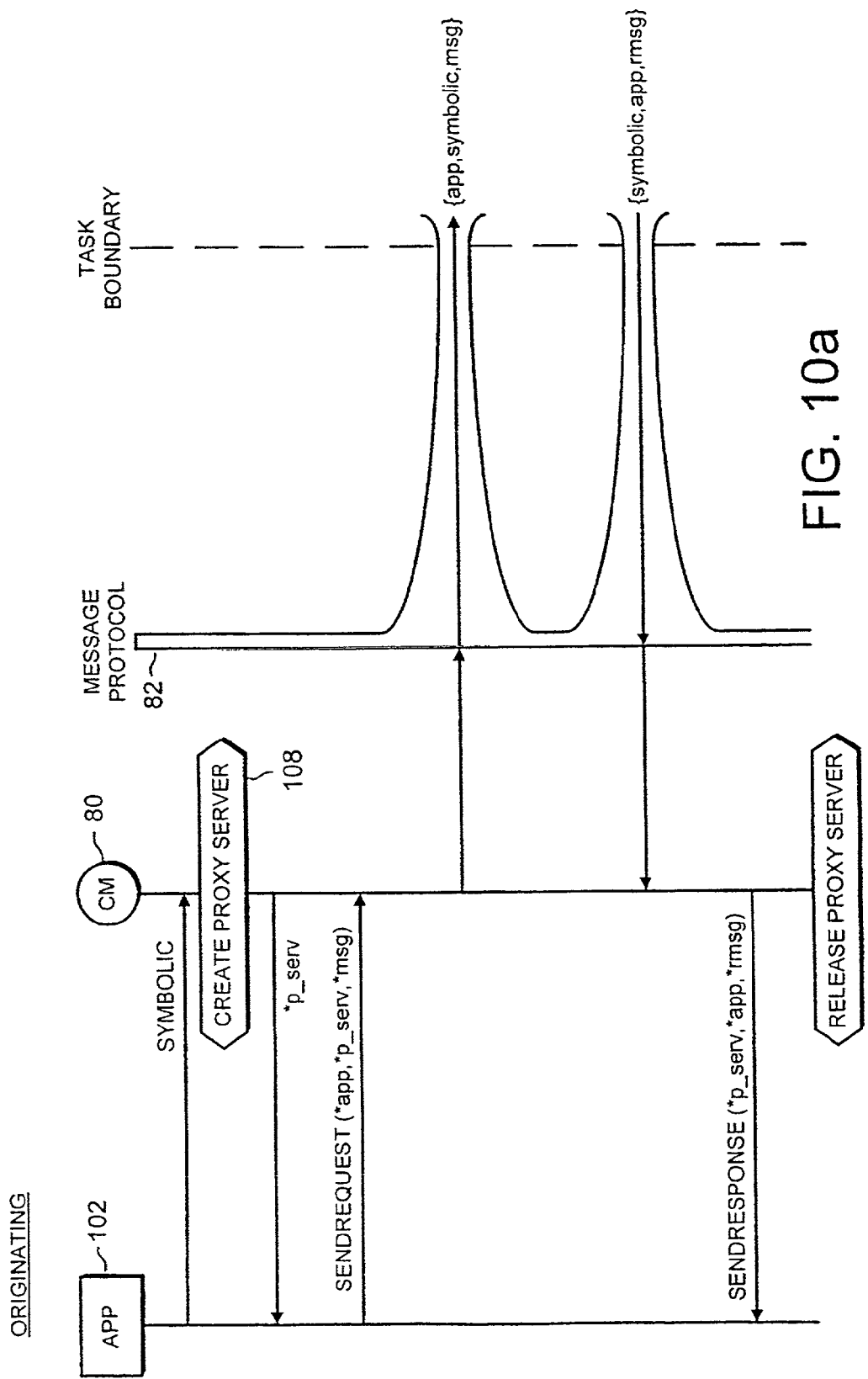

| MESSAGE BODY | DEFINED ORIGIN | DEFINED DESTINATION | ADDITIONAL ADDRESS |
|---|---|---|---|
| REQUEST 160 | APP 1 152 | DIRECTOR 150 | - |
| REQUEST 162 | APP 1 152 | SERV 1 156 | - |
| REPLY 164 | SERV 1 156 | DIRECTOR 150 | APP 1 152 |
| REPLY 166 | DIRECTOR 150 | APP 1 152 | - |

ROUTING

BACKGROUND OF THE INVENTION

1. Field of the Invention

The present invention relates to the routing of messages from a client to one of a plurality or servers and the routing of a reply message back from the server to the client. It particularly relates to the adaptation of messages to achieve this routing.

2. Description of the Prior Art

The functions of an electronic device, for example a radio handset, can be created by defining clients and servers. The servers offer a service or set of services of a resource. The clients access the services by sending request messages to the appropriate server. The result of the access is then returned to the client as a reply message.

The device may however have a plurality of similar resources which provide similar services. These duplicate services may be mutually independent with only one of the plurality being appropriate at any one time. Each of the duplicate resources will have an associated server.

A routing means is therefore needed to route a request message for a service from an originating client to an appropriate one of a plurality of duplicate servers and to route a reply message from the appropriate server to the originating client. Such routing means are known. However, they are complex and have memories for associating a message identifier with the originating client. The identifier is sent in the message to the appropriate resource and is returned in the reply message. The memory is then accessed to identify the originating client to which the reply should be directed.

SUMMARY OF THE INVENTION

It would be desirable to provide a routing means which routes a request message for a service from an originating client to an appropriate one of a plurality of duplicate servers and can route a reply message from the appropriate server to the originating client, but which does not need to store information for each request message received so that the reply message, when received, can be correctly routed.

According to one aspect of the present invention there is provided a director for routing a message from a client to a chosen one of a plurality of servers to access a resource and for routing the response of the resource from the chosen server to the client wherein each message has an indication of its origin, an indication of its destination and a message body, comprising: first input means for receiving a first input message from the client, indicating its source as the client and its destination as the routing means; first output means for providing a first output message to the chosen server, indicating its source as the client and its destination as the chosen server; second input means for receiving a second input message from the chosen server in response to the first output message, indicating its source as the chosen server and its destination as the routing means and having as an addition, an indication identifying the client; and second output means for providing a second output message to the one client in response to the second input message, indicating its source as the routing means and its destination as the one client; the director being arranged to route input messages as output messages, creating the first output message by adapting the indication of destination of the first input message and, creating the second output message, by adapting the indication of destination and the indication of source of the second input message and by removing the addition from the second input message.

It should be appreciated that the director interfaces with the client as if it were the server of the resource providing the service requested by the client as opposed to an intermediary between the client and server. Furthermore, the director does not store information, such as a routing table, associating the client with a message or a server.

It is preferable for the director to route the message received by reformatting them. In particular by reformatting their indications of origin and destination and, if necessary, editing the message by removing the addition.

The director may be arranged to adapt second input messages having a predetermined format different to that of the first input messages and also different to the format of the output messages. The format for the second input message may differ by having the addition appended to it.

It is preferable for the client to use a symbolic resource address identifying the service required. The symbolic address identifies the director as the controller of access to the servers providing that service.

A radio handset may comprise the director and processor means including memory, for performing the functions of the handset by communicating between clients and servers. The client, server and director are each an entity and in particular are objects being specializations of the same base class. Some of the entities may be within the handset, others may be within an ancillary device.

The radio handset may also comprise: an interface coupled to the processor means for coupling to the ancillary device and communicating therewith to enhance the functions of the handset; and routing means, coupled to the processor means, and arranged to provide for communication between an entity in the handset and an entity in the ancillary device by enabling the creation of a proxy entity in the handset for transaction with the entity in the handset, the creation of a proxy entity in the ancillary device for transaction with the entity in the ancillary device and communication between the handset and ancillary device through the interface. The interface may include a radio transceiver.

The routing means in the handset may be arranged to associate each entity within the handset with a task and to provide for communication between an originating entity in an originating task and a destination entity in a destination task by using one or more intra-task transactions and, if necessary, inter-task communication, each transaction involving two entities associated with the same task, said routing means being arranged to provide for communication between an originating entity and a destination entity by enabling, if the originating and destination tasks are the same, the transaction of the originating entity and the destination entity and by enabling, if the originating and destination tasks are different, the creation of a proxy entity in the originating task for transaction with the originating entity, the creation of a proxy entity in the destination task for transaction with the destination entity and communication between the originating and destination tasks via the interface, if necessary.

The client may be arranged to request a service using a symbolic address identifying the service. The routing means is then arranged to determine from the symbolic address if the service is provided within the handset or the originating task. The service may be provided by the director, which operates as a server to the client.

BRIEF DESCRIPTION OF THE DRAWINGS

For a better understanding of the present invention and to understand how the same may be brought into effect reference will now be made by way of example only to the accompanying drawings in which:

FIGS. 5a and 5b illustrate symbolic routing tables;

FIGS. 10a and 10b illustrate inter-task message delivery;

DESCRIPTION OF THE INVENTION

Figure 1:
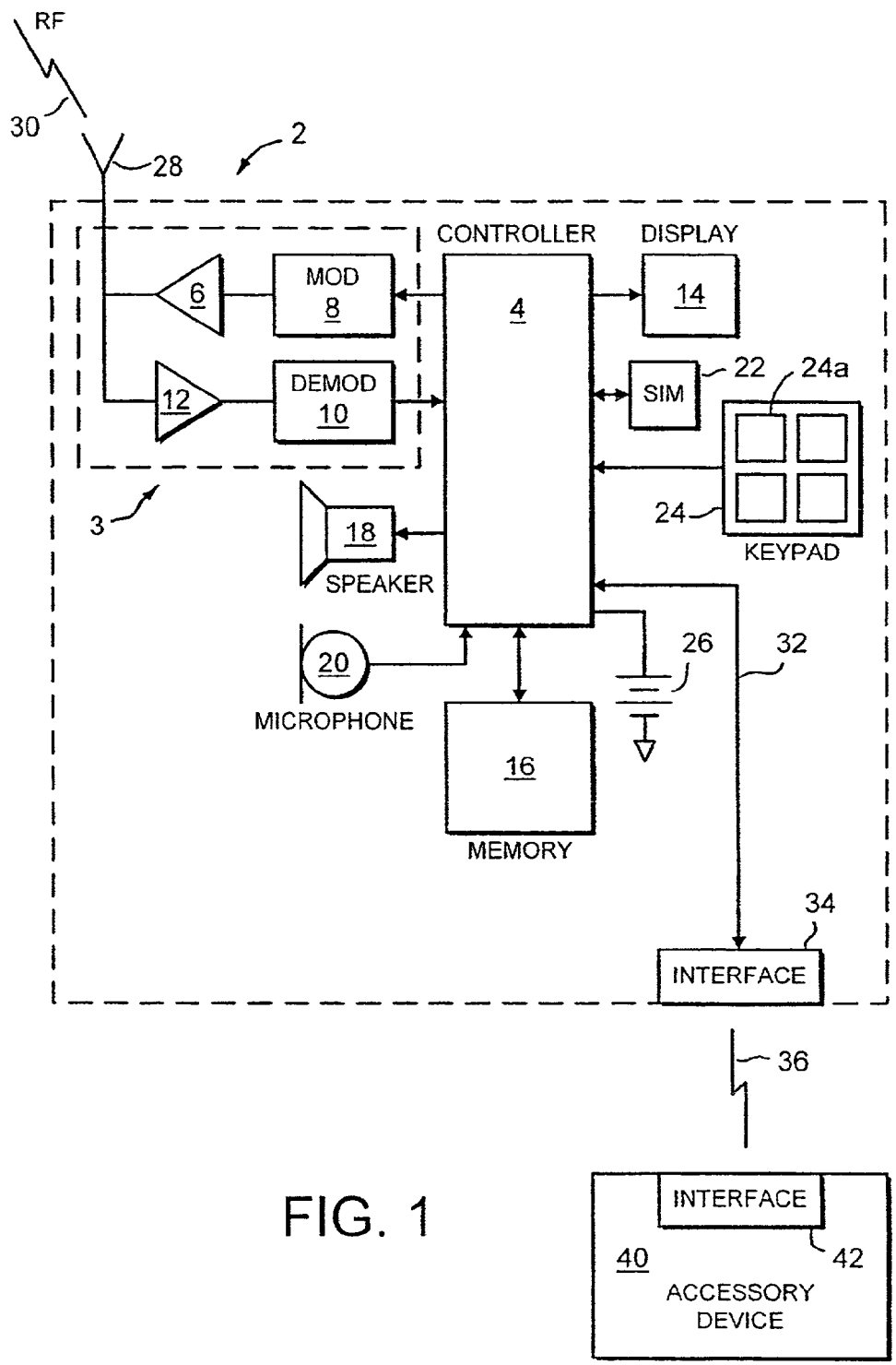
FIGS. 1 and 2 illustrate a radio handset and ancillary device.
Figure 2:
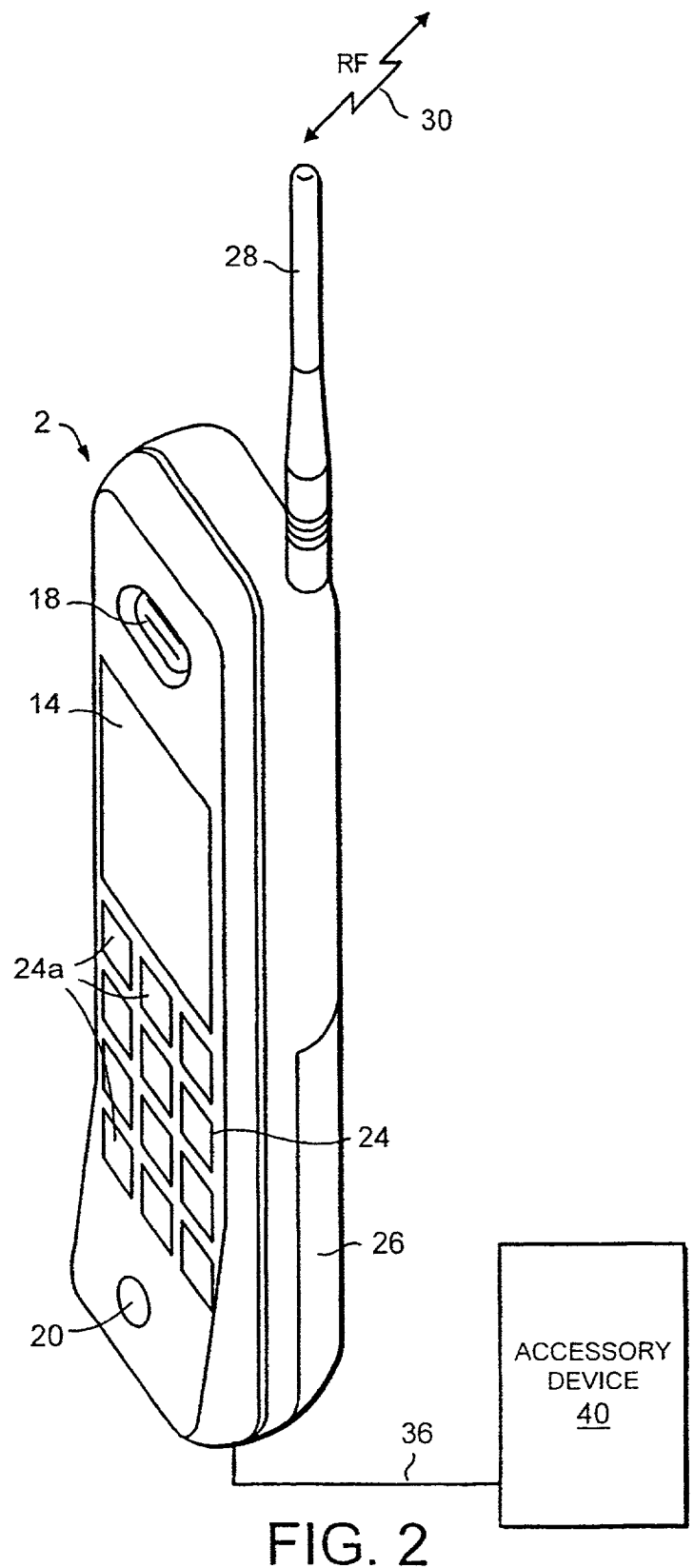

FIGS. 1 and 2 illustrate a hand-portable radio communications device, henceforth referred to as a terminal or radio handset 2. The terminal 2 is small enough to be carried by hand and is preferably sized to fit into a pocket of a jacket. The terminal communicates with other terminals or devices using radio waves.

The terminal 2 has a user interface comprising, for input, a keypad 24 having keys 24a and a microphone 20 and, for output, a speaker 18 and a display 14. The size of keypad 24 and display 14 are necessarily limited by the size of the terminal 2. The terminal 2 is controlled by controller 4 and is powered by battery 26. The controller 4 receives signals from the microphone 20 and the keypad 24 and provides signals to the display 14 and the speaker 18. The terminal 2 has an interface 34 and a transceiver 3, which are used to communicate outside the terminal 2. The interface 34 is connected to the controller via bus 32. The interface may include a transceiver for radio or infra red communication and/or a port for direct electrical connection. The transceiver 3 is a radio frequency transceiver connected to an antenna 28 and controller 4. It is arranged to communicate via a radio frequency interface 30. The transceiver 3 includes a modulator 8 for modulating signals received from the controller 4 and a transmitter 6 which presents the modulated signals to the antenna 28. The transceiver 3 also includes a receiver 12 which processes signals received at the antenna 28 and provides them to a demodulator 10 which provides demodulated signals to the controller 4. The terminal 2 has a RAM memory 16 which is connected to the controller 4 via a bus. The terminal also has a SIM memory 22 connected to the controller 4 which provides information allowing the terminal 2 to function as a mobile phone. When functioning as a mobile phone, the terminal 2 transmits and receives radio frequency signals via the antenna 28.

The terminal 2 is connected to an interface 42 of an accessory device 40 via the interface 34. The connection 36 between the interface 34 and interface 42 may be achieved in a number of ways. For example radio waves could be used. One suitable radio communication protocol is the wireless applications protocol (WAP) described in "WAP Architecture Version 30 Apr. 1998". This requires the interface 34 to comprise a WAP stack and a radio transceiver and the interface 42 to likewise comprise a WAP stack and radio transceiver. Another suitable protocol is the Bluetooth protocol described in co-pending UK Patent Application No 9820859.8, the contents of which are hereby incorporated by reference, which requires the interface 34 and interface 42 to include low power RF transceivers.

Although a single accessory device 40 is shown in FIGS. 1 and 2, the terminal 2 could make simultaneous connection with a plurality of such accessory devices. Although the transceiver 4/antenna 28 and the interface 34 are shown separately, they may be integrated.

The fundamental functions of the terminal 2 are provided by the combination of the controller 4 and the memory 16. The accessory device 40 may be accessed by the controller 4 via the bus 32 and interface 34 and thus enhance the functionality of the terminal 2.

The terminal 2 has a number of fundamental capabilities including system capabilities relating to its radio communication abilities (whether it involves the WAP, Bluetooth, GSM, AMPS or other communication protocols) and other capabilities which allow the terminal to provide the features of a database, a personal organizer, a word processor or a web browser. The fundamental capabilities are integrated together in a coherent way to provide the terminal's features.

The phone's fundamental capabilities are organized in logical groups as resources. Each resource is accessed through a "server". The server encapsulates the resource to provide an interface through which the resource is accessed. "Applications" access resources through the servers and link them together with logic to provide the terminal's features. The applications and resources are connected via a connectivity layer (CL)

Figure 3:
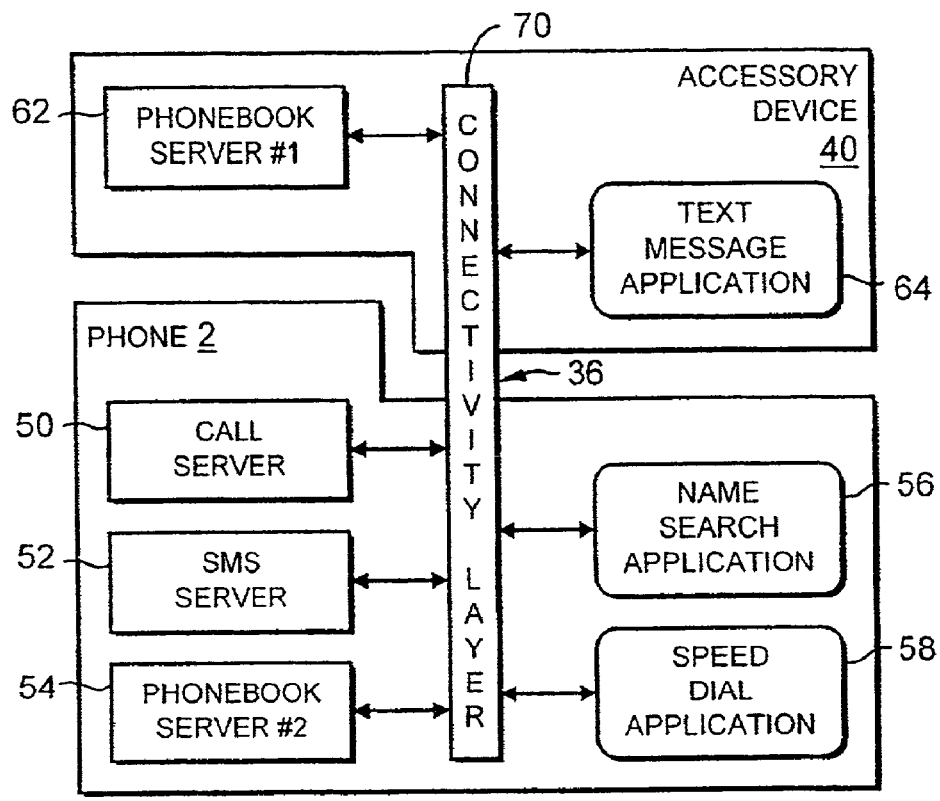
FIG. 3 illustrate the division of a phone's features between a handset and ancillary device.

FIG. 3, illustrates the divisions of the functions of a terminal 2 which is operating as a phone. The phone illustratively has a call server 50 which encapsulates the phone's capabilities to make and receive telephone calls, an SMS server 52 which encapsulates the phone's capabilities of making and receiving short message service (SMS) messages and a phone book server #2 54 which encapsulates a database associating names and telephone numbers. The phone has a name search application 56 which can be used to search for a name within the phone book database served by the phone book server #2 54 and a speed dial application 58 which can be used to make a call via the call server 50. The accessory device 40 has a phone book server #1 62, encapsulating a database associating phone numbers and names, and a text message application 64 for creating and editing text messages. The servers 50, 52 and 54 and applications 56 and 58 within the phone are connected to each other and to the server 62 and application 64 in the accessory device via the connectivity layer 70. The connectivity layer 70 via the interfaces 34 and 42 and the connection 36 provides for communication between the terminal 2 and the accessory device 40. When the accessory device 40 is connected to the phone via the connectivity layer the text message application 64 may be utilized via the phone and used to access the SMS server 52. In addition, the name search application 56 may access the phone book in the accessory device via the phonebook server #1 62 in the accessory device 40.

The controller 4 in the terminal 2 is typically a micro processor which is controlled by code. Within a terminal there may be a number of simultaneous functions which need to be carried out by the controller in parallel. However the controller may only be able to carry out one piece of code at a time and will have to task these functions. Tasking in this context means that the controller allocates its processing resources in a cyclic manner. That is it sequentially spends a short period of time on each task in an ordered series of tasks and then repeats the sequence. Tasks are therefore time division multiplexed but are logically distinct. Consequently over the course of several sequences the tasks necessary to perform a function are carried out. Using tasks allows the processing load on the controller to be balanced.

An application is a piece of code which runs on the controller 4. The application is defined in the memory as an object. The memory 16 is used in the terminal 2. This object has an object address allowing it to be addressed in the memory and is a specialization of a Connectivity Layer (CL) base class. The application uses the services of one or more servers to build features and can present these features to the user.

A server encapsulates a resource with a standard interface. It is an object stored in memory. The memory 16 is used in the terminal 2. The object has an object address allowing it to be addressed in the memory and is a specialisation of the Connectivity Layer (CL) base class. Each server provides a service by controlling a resource or other server. It provides a standard interface to a resource which can be accessed only via the connectivity layer 70.

Figure 4:
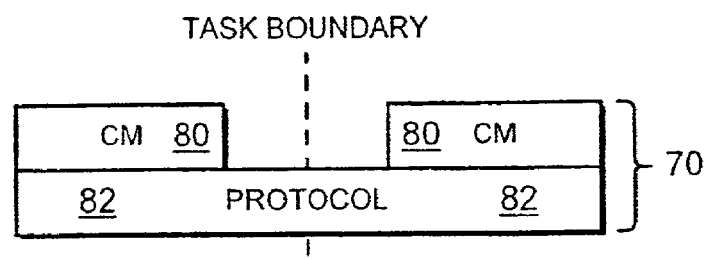
FIG. 4 illustrates the connectivity layer.

Applications access a server using a symbolic resource address which indicates the service required but not the object address of the server. The connectivity layer 70 is illustrated in more detail in FIG. 4. The connectivity layer is a combination of communication managers (CM) 80 and message protocol 82. A single communications manager controls each task. The CM 80 transmits messages between objects within a task (intra-task messages) using transactions involving the source object of the message and the destination object of the message. The message protocol 82 controls the routing of messages between tasks (inter-task messages). The inter-task communication may take any one of a number of forms of communication such as WAP, Bluetooth or a bus to another device or to another task.

Each communications manager has a symbolic routing table. The symbolic routing table contains an entry for each object (each application and server), that the communications manager 80 interconnects to define its task, the local task. Applications do not have symbolic addresses and each application object address is associated with a default symbolic address. Each of the servers connected to the communications manager 80 has its object address associated with the symbolic address identifying the service provided by the resource it encapsulates. An example of a symbolic routing table for the Phone 2 in FIG. 3, assuming all the applications and servers are within the same task, is illustrated in FIG. 5a. An example of a symbolic routing table for the Accessory Device 40 in FIG. 3, assuming all the applications and servers are within the same task, is illustrated in FIG. 5b. For the sake of clarity the reference numbers used in FIG. 3 are illustratively used as object addresses.

The communications manager 80 can use the symbolic routing table to identify from a symbolic address provided by an application, whether the server associated with that symbolic address is within the local task and to provide the associated object address to the application. If the service requested by an application is not within the local task, the communications manager 80 passes control to the message protocol 82. The message protocol 82 sends the request from the original communications manager to the communications manager which is interconnected to the appropriate server. Any suitable protocol may be used to send these extra-task messages. Communication between tasks is asynchronous.

The communications manager queues intra-task messages. It handles extra-task messages such as those which need to go outside its local task and those received from outside its local task. The communications manager processes one message at a time and it is preferred for the communications manager to clear intra-task messages before servicing received extra-task messages.

The connectivity layer 70 hides the physical location of a resource behind a standard interface. The CL provides an indirect message routing mechanism which allows applications to use symbolic addressing to access an appropriate server and the resource it encapsulates by sending a request message. The CL allows the server to return the results of the access to the appropriate application by sending a reply message. Applications can access resources without knowing or caring where the resource or server which controls the resource is implemented. The resource may therefore be within the terminal 2 or the accessory device 40. The application needs to know only the symbolic address of a resource and the protocol for interfacing with the connectivity layer to be able to access and use it.

Figure 6:
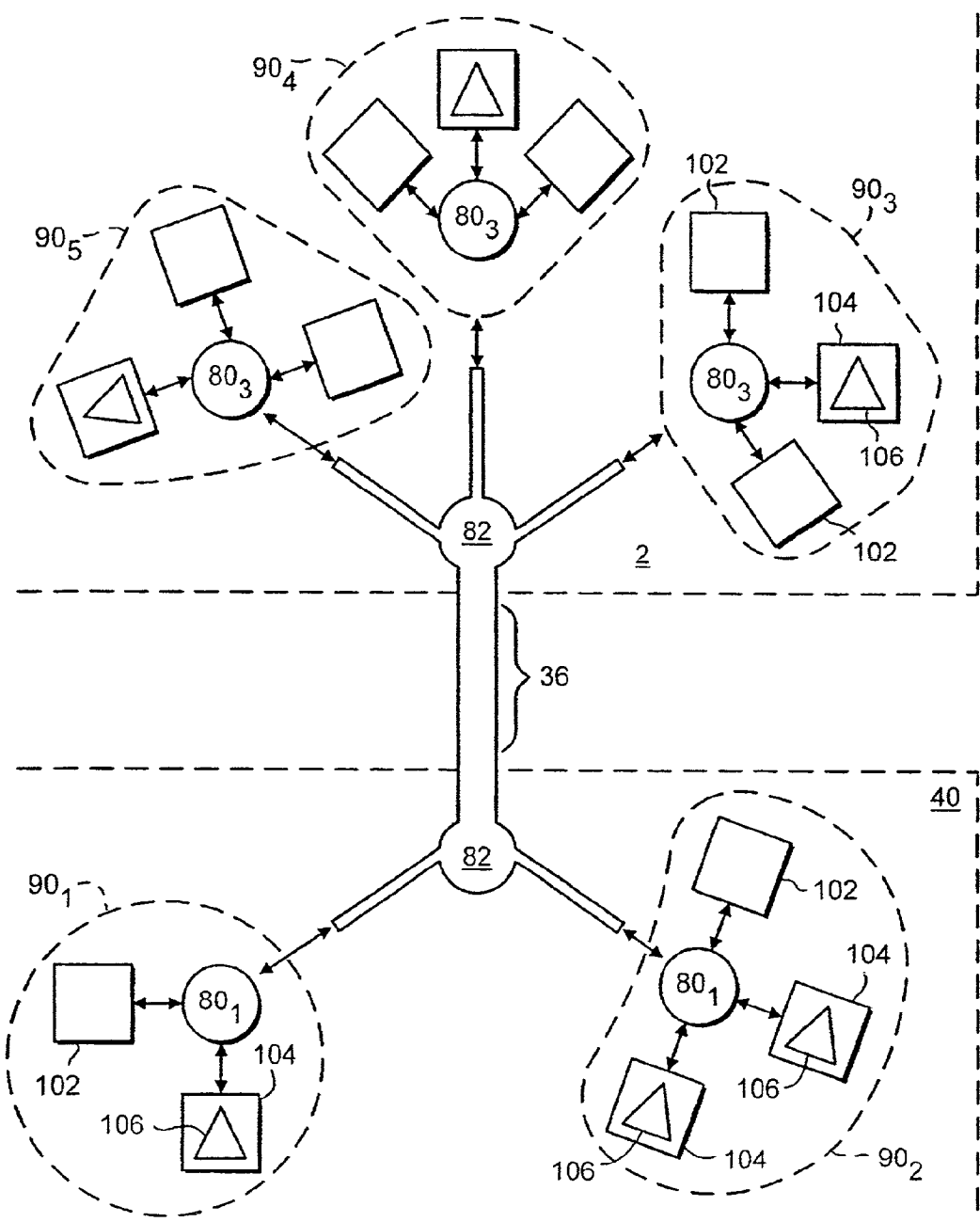
FIG. 6 schematically illustrates the tasks within the handset and the ancillary device.

FIG. 6 illustrates the terminal 2, connection 36 and the accessory device 40 previously described in relation to FIGS. 1 and 2. This drawing is schematic illustrating how the tasks $90_1$ and $90_2$ of the accessory device and the tasks $90_3$, $90_4$ and $90_5$ of the terminal are interconnected via the connectivity layer 70. Logically, a task may be considered to comprise applications and servers linked by a communications manager. The CM which is itself within the task defines, using the symbolic routing table, the objects (i.e. applications and servers) within the task it controls. The CM, and objects in a task are stored in "local" portions of the memory. Pointers can be used within this local memory to point to objects within the same task. Pointers should not be used to point from one task to another task as this may cause conflict between tasks and the use of the term "pointer" should be understood in this light.

The message protocol 82 interconnects each of the communication managers 80. FIG. 6 is illustrative of the independence of the different tasks $90_i$. The task boundaries are illustrated by dotted lines and the task boundaries do not overlap. Each task $90_i$ has an associated communications manager $80_i$ which is in two-way communication with the message protocol 82. The task also includes a number of objects 100. These objects may be applications 102 or servers 104. The servers encapsulate a resource 106.

An object within a task cannot directly communicate with another object, it can only communicate with the task's communications manager 80. The communications manager 80 effectively de-couples the applications from the services/resources they require. The application need only request the desired service from the communications manager 80 which then facilitates access to the necessary resource. This resource may be within the same task as the application or may be in another task within the same device or within a different device but linked to the original task via the message protocol 82. The destination server receives a request from the communications manager 80 within its own task and responds to that communications manager 80 the communications manager 80 ensures that the response is routed back to the correct application.

Figure 7:
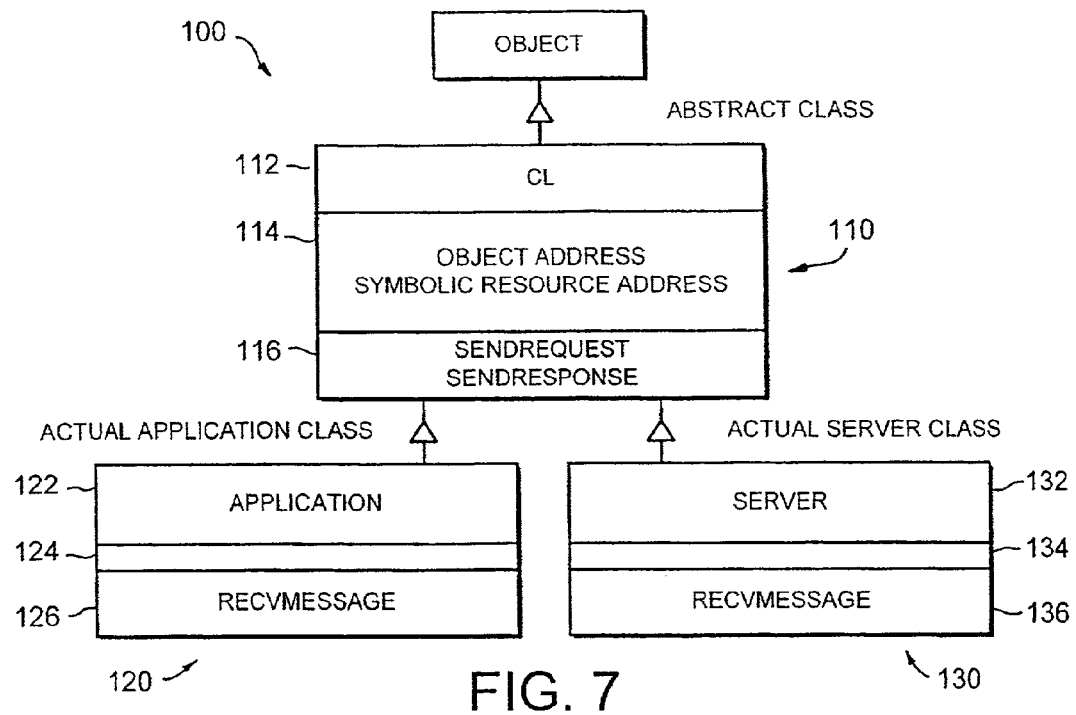
FIG. 7 illustrates the application object and server object.

FIG. 7 illustrates the object orientated encapsulation in the communication manager 80. A base or abstract class 110, henceforth referred to as the connectivity later (CL) class has three portions: the name 112, attributes 114 and functions 116. The abstract CL class has two specializations 120 and 130. The specialization 120 represents an application object 102. The specialization 120 has a name 122, attributes 124 (empty) and functions 126. The specialization 130 represents a server object and has name 132, attributes 134 (empty) and functions 136. The specializations 120 and 130 have a single function 126, the RECVMESSAGE function. The specializations themselves have no attributes.

A specialization of an abstract class uses the attributes 114 and functions 116 of the abstract CL class 110. The abstract CL class 110 includes as attributes an object address and a symbolic resource address. The functions of the abstract CL class 110 include the SENDREQUEST function and SENDRESPONSE function. All objects of the abstract CL class 110 therefore share the same attributes 114 and functions 118. The application object 102 additionally has a RECVMESSAGE function 126. The server object 104 additionally has a RECVMESSAGE function 136. An object can only invoke a function in (transact with) another object of the same task.

A first object (application or server) can request services from a resource encapsulated by a second object (server). This is achieved by sending a message to the other server and receiving a reply message therefrom. For first and second objects within the same task, the transactions in the CM 80 is as follows. The CM 80 operates differently if the second object is not within the local task.

Figure 8:
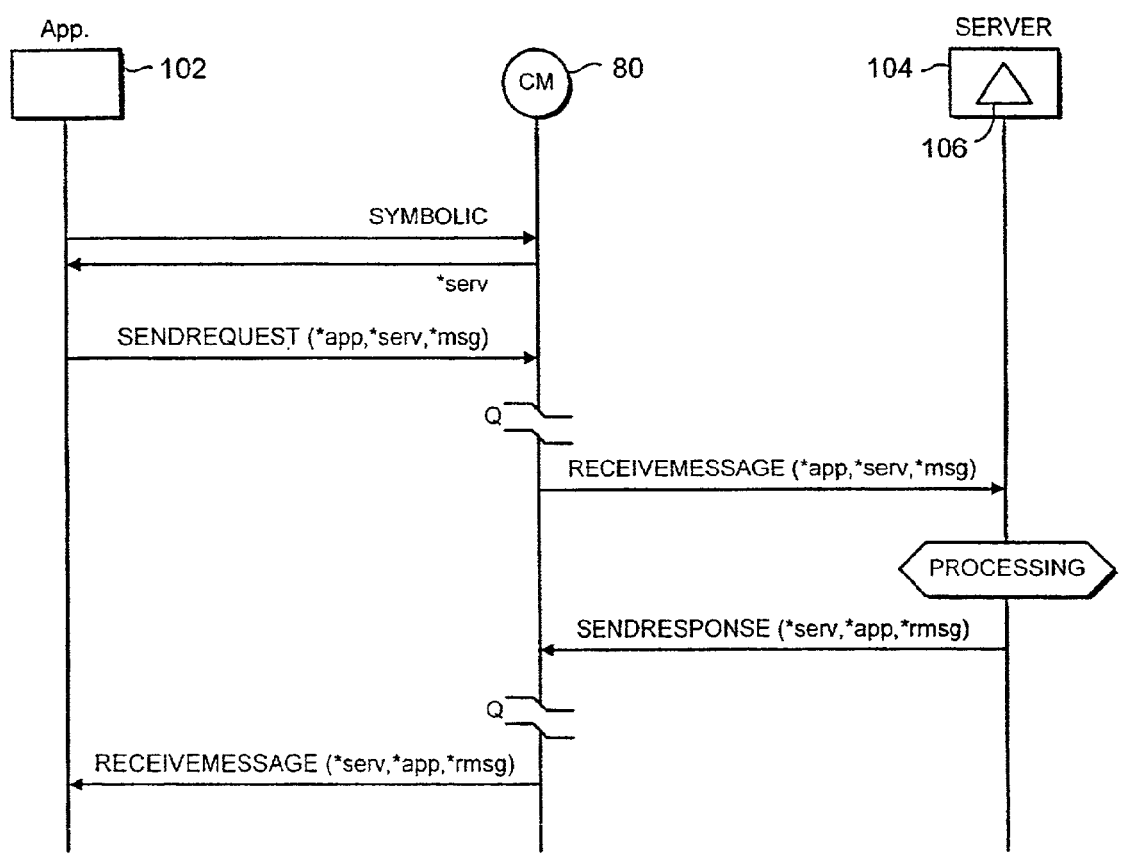
FIG. 8 illustrates inter-task message delivery.

The process of intra-task communication is illustrated in FIG. 8. The communications manager 80 mediates communication between an application 102 and the server 104 encapsulating a response 106. The application and server are within the same task 90. The application wishes to access a service. It is aware of the service it requires and the symbolic address of this service. It is not aware of the object address of the server which provides this service. The application provides the symbolic address to the communications manager 80 and receives as a reply a pointer to the appropriate server *SERV. The communications manager uses its symbolic routing table to perform this function.

The application has an object address APP and a pointer to the application is designated *APP. The server has an object address SERV and a pointer to the server object is designated *SERV. The application sends a message MSG towards the server by calling the function SENDREQUEST with the arguments *APP, *SERV and *MSG where *MSG is a pointer to the message MSG. This function takes as its arguments a pointer to the originating first object (i.e. the first object's address), a pointer to the second destination object (i.e. the second object's address) and a pointer to the message body defining the service required. The communication manager queues the message and then send it onwards towards the server by calling the function RECVMESSAGE in the server. The RECVMESSAGE function has as its arguments *APP, *SERV and *MSG. The RECVMESSAGE function takes as its arguments a pointer to the first originating object (i.e. the first object's address), a pointer to the second destination object (i.e. the second object address) and a pointer to the body of the message. The server receives the message and processes it accessing the resource 106. It then sends a reply message (RMSG) towards the application. This is achieved by calling the function SENDRESPONSE in the application object 102. This function has as arguments *SERV, *APP and a pointer to the reply message RMSG, *RMSG. The communications manager 80 places this message on its internal queue. The reply message RMSG is then sent to the application by calling the function RECVMESSAGE in the application object. The RECVMESSAGE function has as its arguments *SERV, *APP and *RMSG. Thus the application receives the reply message.

It will therefore be appreciated that a first object communicates with a second object 62 via the communications manager 80 by sending messages. These messages are particular types of messages involving one or more transactions. Intra-task messages are initiated by the object from which the message originates calling a function in (transacting with) the object to which the message is directed. The function includes a pointer to the originating object, a pointer to the destination object and a pointer to the body of the message. The message, the first object and the second object are all within a local memory space allocated to a single local task by the CM 80. In this way, message delivery within a task is completely isolated from the message delivery in other tasks. A problem however arises when the server to which access is requested by an application or other server does not lie in the same local task as that application. The destination object does not lie within the same local task. This problem is addressed by creating a proxy object within the same local task as the originating object and a proxy object in the same local task as the destination object. The proxy objects in the originating task looks to the originating object as if it is the destination object and transacts with the originating object. The proxy objects in the destination task looks to the destination object as if it is the originating object and transacts with the destination object.

The proxy objects encapsulates the mechanism by which messages are sent between tasks. Consequently, a first object in a first task can send a message to a second object in a second task by transacting with a proxy object in the first task. The proxy object thereafter takes care of the communication from the first to second task through the message protocol 82.

Figure 9:
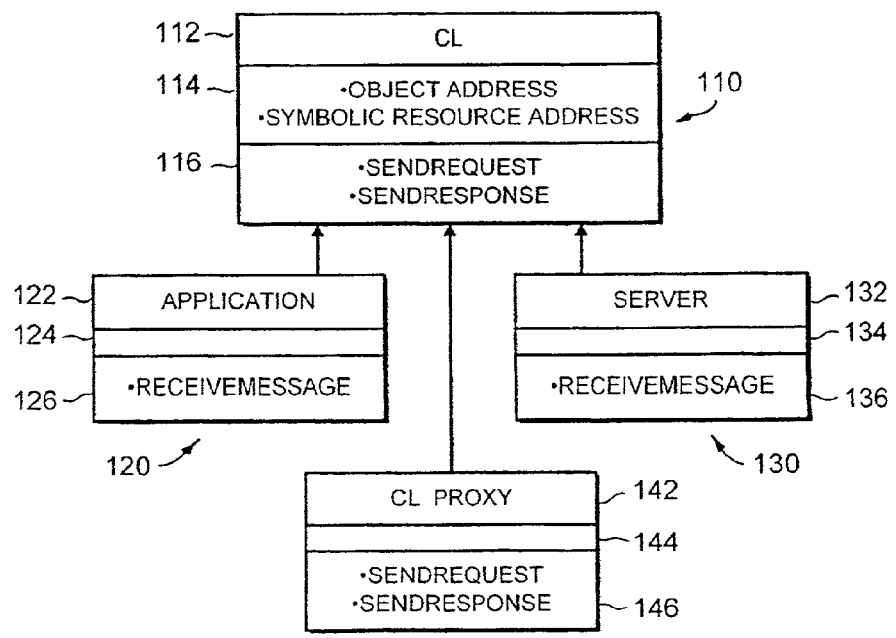
FIG. 9 illustrates the proxy object.

FIG. 9 illustrates the object orientated encapsulation in the communications manager 80 including the specialization 140 representing the connectivity layer (CL) proxy. The specialization 140 represents a proxy object 108. The specialization 140 has a name 142, attributes 144 (empty) and functions 146. The specialisation 140 has two functions; the SEND REQUEST function and the SEND RESPONSE function. The effects of calling the SEND REQUEST function and SEND RESPONSE function in the CL proxy object are different to the effects caused when calling the SEND REQUEST or SEND RESPONSE functions in the application or server objects. The proxy object represents an object executing in another task, it is never the final destination for a message, but an interface between tasks.

Figure 10B:
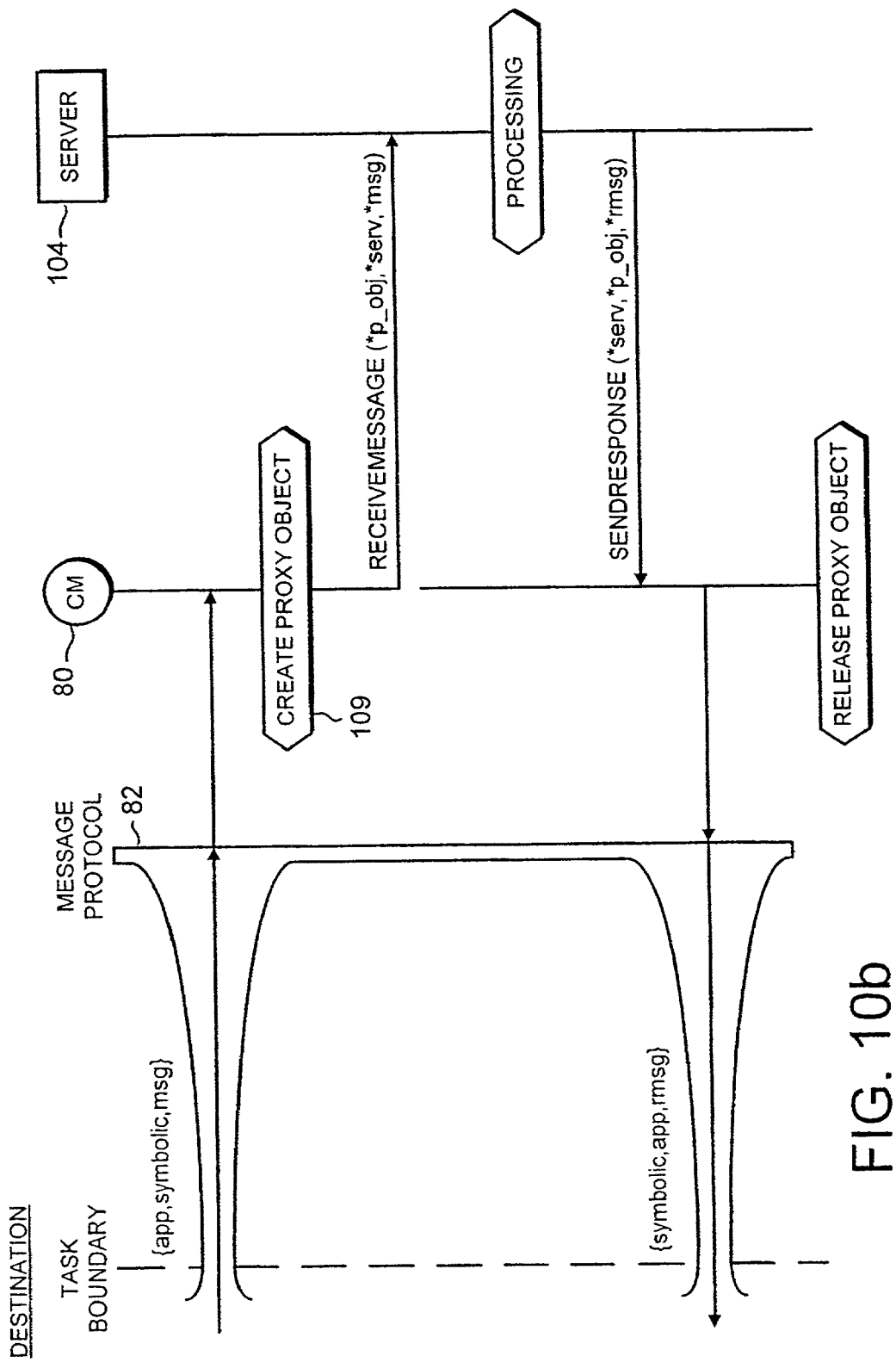

The process of inter-task communication is illustrated in FIGS. 10a and 10b. The connectivity layer comprising the communications manager 80 of the originating task, the communications manager 80 of the destination task and the inter linking message protocol 82, mediates communication between an application 102 in the originating task and a server 104 encapsulating a resource 106 in the destination task. The application 102 wishes to access a service. As before in inter-task communication, the application provides the symbolic address of the desired resource to the communications manager 80 of the originating task. The communications manager 80 is unable to find an associated object address in its routing table as the symbolic address relates to a service provided in another task. It is therefore aware that the desired service lies outside the task it controls. The communications manager creates a proxy server and returns a pointer *P_SERV pointing to the proxy server object to the application 102. The communications manager 80 in the originating task also creates a temporary entry in its resource routing table associating the symbolic resource address received with the object address P_SERV of the proxy server created. This temporary entry is flagged as a proxy. The application 102 on receiving the pointer to the proxy server calls the SENDREQUEST function in the proxy server. The SENDREQUEST function has as its arguments a pointer *APP pointing to the application 102, a pointer *P_SERV pointing to the proxy server and a pointer *MSG pointing to the body of the message being sent. The communications manager 80 responds to the calling of SENDREQUEST in the proxy server by accessing the message protocol 82 in the connectivity layer 70. The message protocol 82 transfers a message from the originating task to the destination task across the task boundary. The extra-task message sent includes the address APP of the originating application 102, the symbolic resource address associated with the pointer *P_SERV and the address of the message being sent.

The communications manager 80 in the destination task receives the message sent across the task boundary. From the symbolic resource address contained therein, it realises that the service required is within the task it controls.

The communications manager 80 therefore creates a proxy object 109 having an address P_OBJ. The communications manager 80 accesses its symbolic routing table to obtain the object address SERV associated with the symbolic resource address. The communications manager 80 then makes an association between the application address APP received in the message across the task boundary and the address of the created proxy object 109. The association preferably makes the address of the proxy object the same as the address APP. Then the communications manager 80 allocates the portion of memory containing the message MSG and pointed to by the pointer *MSG to its own task.

The communications manager 80 then calls the RECVMESSAGE function in the server 104. The RECVMESSAGE function has as its arguments the pointer *P_OBJ pointing to the proxy object 109, the pointer *SERV pointing to the server 104, and the pointer *MSG pointing to the message body now within the destination task. Consequently the arguments of the RECVMESSAGE function are pointers within the destination task only. The transaction does not cross the task boundary. The server receives the MSG and processes it accessing the resource 106. It then sends a reply message (RMSG) back towards the origin of the request. The reply message is sent by calling the function SENDRESPONSE in the proxy object 109. This function has as arguments *SERV, *P_OBJ, and *RMSG which is a pointer to the body of the reply message. The function SENDRESPONSE in the proxy object defines implicitly that a message sent by calling it is intended for another task. The communications manager 80 then sends the reply message from its task back to the originating task across the task boundary via the message protocol 82. The communications manager uses its symbolic routing table to replace the address of the server 104 (SERV) with the symbolic resource address and it uses the association it previously created between the address of the proxy object 109 and the address of the application 102 to send in the message across the task boundary, the symbolic address, the application address APP, and the address of the reply message RMSG. The communications manager 80 then releases the proxy object 109, removes the association between the proxy object address and the originating application address APP and de-allocates the portion of the memory which held the message MSG.

The communications manager in the originating task 18 receives the extra-task message from the destination task via the message protocol 82. The communications manager 80 allocates the portion of the memory 16 holding the message RMSG to the task it controls. It uses the association it previously made between the symbolic resource address contained in the received message from the destination task with the address of the proxy server 108 to call the SENDRESPONSE function in the application 102. This function takes as its arguments *P_SERV pointing to the proxy server, *APP pointing to the application 102 and *RMSG pointing to the reply message now part of the same task. It will be appreciated that all the arguments of the function SENDRESPONSE are pointers within the originating task. The transaction does not cross the task boundary. Thus the application 102 receives the reply message RMSG. The communications manager 80 then releases the proxy server 108, removes the association of the address of the proxy server and the symbolic resource address from its symbolic routing table and de-allocates the portion of the memory 16 holding the message RMSG.

A server offers a set of services to any application and can be inside or outside the terminal 2. The connectivity layer directs requests from applications to the appropriate server. The default server for a certain resource is the server to which the connectivity layer directs all requests for that resource.

The combination of terminal and ancillary device, or the terminal itself, may contain two or more similar resources that is resources providing the same service identified by the same symbolic resource address. Each of the similar resources has a server. This means that there will be duplicate servers. For example there may be duplicate phonebooks one in the terminal 2 and another in the accessory device. Both phonebooks will have their own servers. As another example, a terminal 2 operating as a multi-mode phone will have two types of resources for making and receiving calls and duplicate servers one for each resource. A first duplicate server accesses a first cellular/cordless system and a second duplicate server accesses a second cellular/.cordless system. The cellular system may be for GSM, AMPS, UMTS etc. The cordless system may be DECT. The phone may have cellular/cellular dual modes or cellular/cordless dual modes.

When there are duplicate servers then a director must take a higher level of control and arbitrate between the duplicate servers. The director defines which of the duplicate servers is the default server at any one time. The director may be one of the duplicate servers or may be a completely different entity.

The director is a router which routes the request to the correct resource and returns any reply from the resource to the originating application that made the request.

Figures 11A, 11B:
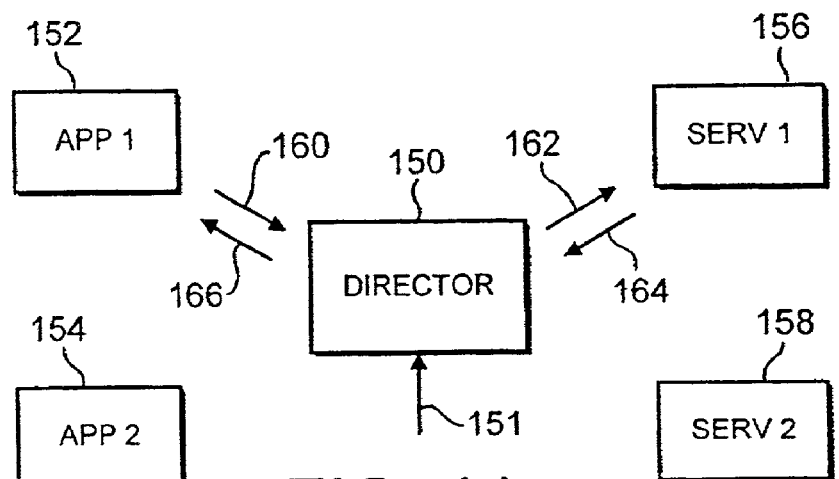
FIG. 11a illustrates routing of messages by a director.
FIG. 11b illustrates the reformatting of messages.

FIG. 11a illustrates how a message is routed. Two separate applications APP1 152 and APP2 154 are illustrated. Each can make requests to access the resources of duplicate servers SERV1 156 and SERV2 158. The request message 160 is made to a director 150, which arbitrates which of the duplicate servers is the default server. The director 150 sends the request message 162 to the default duplicate server, SERV1 156 in this example. The server SERV1 156 performs its function and returns a reply message 164 to the director 150. The director 150 in response, provides the reply message 166 to the application APP1 152. The director 150 receives input signals 151 which are used to control the arbitration process. Thus depending upon the signal 151, the signal 160 or a combination of both signals, the director chooses which of servers SERV1 and SERV2 to route the message to as message 162.

Each of the messages 160, 162, 164 and 166 identify the origin and destination of the particular message. The message 160 identifies the originating application APP1 152 as the origin and identifies the director 150 as the destination.

The director modifies the message 160 to produce the message 162. The message is reformatted so that the message 162 identifies the default server as the destination. The identification of the origin is not changed.

The default server knows it is a directed server and that it can only receive messages from the director. The reply message 164 produced by the server SERV1 156 identifies the default server SERV1 as the origin and the director 150 as the destination. The reply message in addition identifies the originating application. This may be achieved by using a format in which the address of the originating application APP1 152 is appended to the end of the message 164.

The director modifies the reply message 164 received from the default duplicate server SERV1 156. The message is reformatted. The appendix to message 164 is removed, the director 150 is identified as the origin and the originating application APP1 152 is identified as the destination. The modified reply message is sent to the originating application as message 166.

Figure 12:
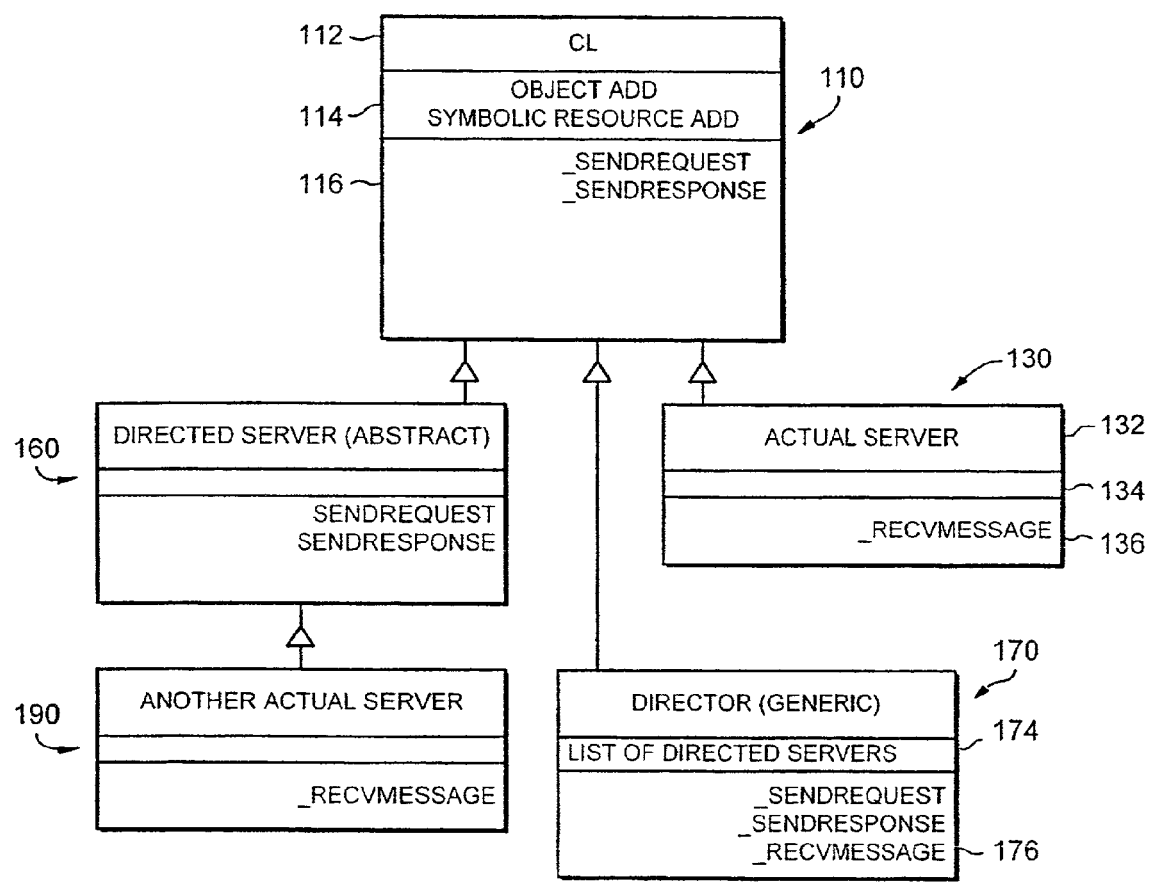
FIG. 12 illustrates the director, and directed server objects.

FIG. 11b is a table illustrating the defined origin and the defined destination of each of the different messages 160, 162, 164 and 166 and whether a message has an additional address appended to it. FIG. 12 illustrates how a director 150 and directed servers 156 and 158 can be implemented using an object oriented encapsulation of the connectivity layer. The base class 110 and the actual server specialisation 130 have been previously described with reference to FIG. 7. The Director is an object formed as a specialisation 170 of the base class 110. It has as its attributes 174 a list of all the directed servers. It has as its functions 174 the functions SENDRESPONSE, SENDRESPONSE and RECVMESSAGE.

The directed server is an object formed as a specialization 190 of the base class 180 which is itself a specialization of the base class 110. Neither the specialization 180 or its specialization 190 have attributes. The specialization 180 has as functions, SENDREQUEST and SENDRESPONSE. The specialization 190 representing the directed server has as a function, RECVMESSAGE.

Figure 13A:
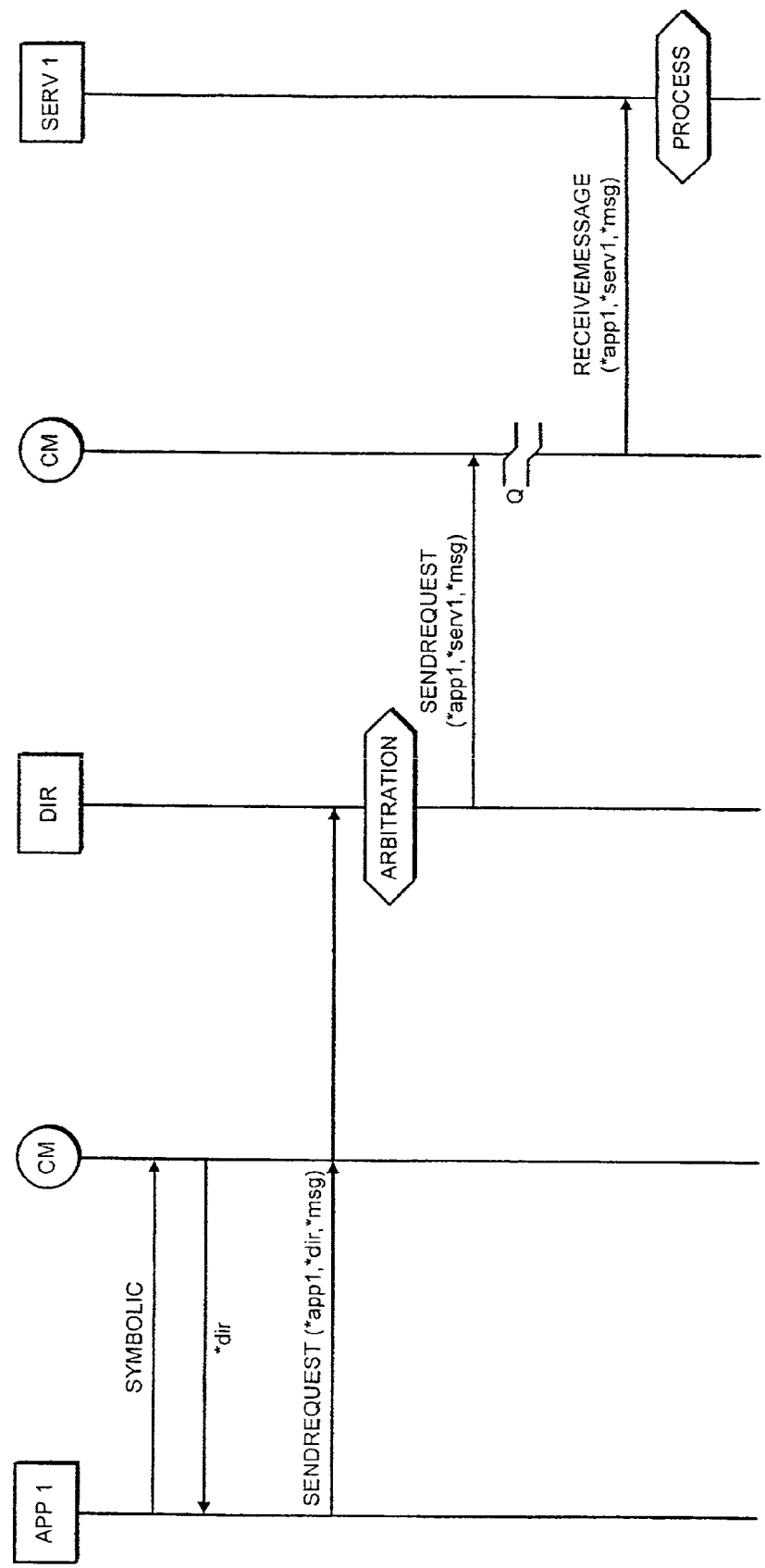
FIGS. 13a and 13b illustrates message routing within a single task.
Figure 13B:
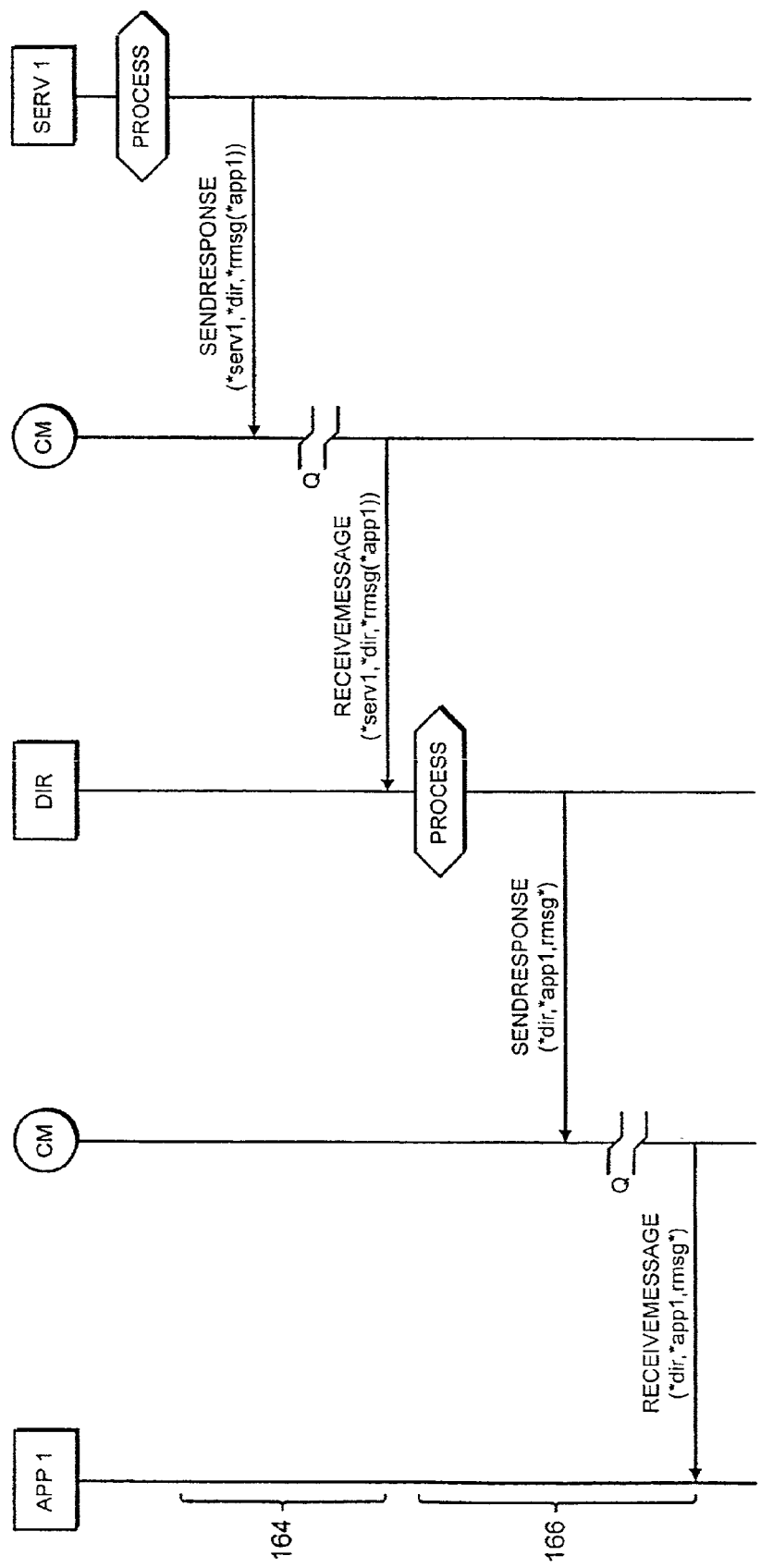

FIGS. 13a and 13b illustrates how the messages 160, 162, 164 and 166 are transferred by one object calling a function of another object. The application APP1 requests a service by sending a symbolic resource address identifying the service required to the communication manager of the application's task. Assuming the director is in the same task, the communications manager returns a pointer *DIR pointing to the director object by accessing its symbolic routing table. Otherwise a proxy will be created as previously described.

The application APP1 calls the function SENDREQUEST in the director object. This function has as its arguments: *APP pointing to the origin of the message, the application APP1; *DIR pointing to the destination of the message, the director; and *MSG pointing to the body of the message sent.

The director performs its arbitration process and determines which of the duplicate servers it controls is the default server, in this instance, the server SERV1. The director calls the SENDREQUEST function in the object SERV1. This function has as its arguments: *APP pointing to the effective origin of the message, the application APP1; *SERV1 pointing to the destination of the message, the server SERV1; and *MSG pointing to the body of the message sent. The message is queued in the communications manager, which then calls the function RECEIVEMESSAGE in the object SERV1. This function has as its arguments: *APP pointing to the effective origin of the message, the application APP1; *SERV1 pointing to the destination of the message, the server SERV1; and *MSG pointing to the body of the message sent.

The server SERV1 performs its function and sends a reply message back towards the original application by calling the function SENDRESPONSE in the director object (see FIG. 13b). This function has as its arguments: *SERV1 pointing to the origin of the message, the server SERV1; *DIR pointing to the destination of the message, the director; and *RMSG pointing to the body of the reply message being sent. The reply message includes a pointer to the originating application *APP. The reply message is queued in the communications manager, which then calls the function RECEIVEMESSAGE in the director object. This function has as its arguments: *SERV1 pointing to the origin of the message, the server SERV1; *DIR pointing to the destination of the message, the director; and *RMSG pointing to the body of the reply message.

The director processes the message. It calls the function SENDRESPONSE in the application object APP1. This function has as its arguments: *DIR pointing to the origin of the message, the director; *APP1 pointing to the destination of the message, the application APP1; and *RMSG pointing to the body of the reply message. The message is queued by the communications manager, which then calls the function RECEIVEMESSAGE in the application APP1. This function has as its arguments: *DIR pointing to the origin of the message, the director; *APP1 pointing to the destination of the message, the application APP1; and *RMSG pointing to the body of the reply message.

The preceding description describes a preferred implementation of the invention and preferred applications of the invention. It should be appreciated that other implementations and applications may be utilised without departing from the scope of the invention as claimed.

What is claimed is:

1. A director for routing a message from a client to a chosen one of a plurality of servers to access a resource and for routing a response of the resource from the chosen server to the client wherein each message has an indication of its origin, an indication of its destination and a message body, comprising:

first input means for receiving a first input message from the client, indicating its source as the client and its destination as the routing means;

first output means for providing a first output message to the chosen server, indicating its source as the client and its destination as the chosen server;

second input means for receiving a second input message from the chosen server in response to the first output message, indicating its source as the chosen server and its destination as the routing means and having an additional indication identifying the client; and second output means for providing a second output message to the client in response to the second input message, indicating its source as the routing means and its destination as the client; and wherein said director is arranged to route input messages as output messages, creating the first output message by adapting the indication of destination of the first input message and, creating the second output message, by adapting the indication of destination and the indication of source of the second input message and by removing the additional indication from the second input message.

2. A director as claimed in claim 1, further comprising arbitration means having a third input means for receiving inputs and being responsive thereto to determine the chosen server from the plurality of servers.

3. A director as claimed in claim 1, arranged to adapt the second input message having a predetermined format, different to that of the first input messages.

4. A director as claimed in claim 1, wherein the format of the second input message differs from that of the first input message in that the second input message has the additional indication at its end.

5. A director as claimed in claim 1, wherein said client, chosen server and director are respectively first, second and third objects, each being a specialization of a same base class.

6. A director as claimed in claim 5 wherein the sending of a message from an originating object to a destination object involves the calling of a function in the destination object.

7. A director as claimed in claim 6 wherein the function has a pointer to or an address of the originating object and a pointer to or an address of the destination object as arguments thereof.

8. A radio handset comprising:

a director as claimed in claim 1;

processor means including memory, for performing the functions of the handset by communicating between clients and servers.

9. A radio handset as claimed in claim 8 wherein each of said plurality of servers accesses means for making and/or receiving a call according to a different radio communications standard.

10. A radio handset as claimed in claim 8 wherein the clients are defined within the processor means.

11. A radio handset as claimed in claim 10 wherein the director is defined in the processor means of the handset.

12. A radio handset as claimed in claim 11 wherein the chosen server is defined in the processor means of the handset.

13. A radio handset as claimed in claim 8 wherein the clients are arranged to request a service using a symbolic address identifying the service and to receive in response thereto identifying the director which controls access to duplicate servers providing the service.

* * * * *